United States Patent Office.

JOHN SEE, OF BALTIMORE, MARYLAND.

Letters Patent No. 65,956, dated June 18, 1867.

IMPROVED COMPOSITION FOR ROOFING, PAVEMENTS, WALLS, DOCKS, AND OTHER STRUCTURES.

*The Schedule referred to in these Letters Patent and making part of the same.*

TO ALL WHOM IT MAY CONCERN:

Be it known that I, JOHN SEE, of Baltimore, in the county of Baltimore, and State of Maryland, have invented an Improved Composition for Roofing, for Walls and Foot-Pavements, for Plastering Outside Walls, and Covering Damp Walls and Docks, for Lining Cisterns and Hydrants, and for Making Pillars or Columns, Water Bricks, Water Pipes, and Burial Cases; and I do hereby declare that the following is a full and exact description thereof.

I employ the following ingredients for the composition, and in the proportions named, or thereabouts: Iron ores, pulverized, fifty parts; hydraulic lime or cement, fifteen parts; sand, clean, sharp, fifteen parts; marble, ground, fifteen parts; coal, pulverized, eight parts; lime, eight parts; salt, fine or ground, four parts. The proportions named are about what I consider the best; but they may vary considerably therefrom without much detriment to the composition. The materials, as indicated, should all be in a fine state, or suitable for mixing, and to produce the proper consistency of composition.

Instead of iron ore, (which may be of any kind,) iron borings or turnings may be used; and for ground marble ground slate may be substituted, though I prefer the marble. The coal may be either anthracite or bituminous, using the coal dust.

The ingredients, when properly prepared and proportioned, are to be thoroughly mixed in the dry state, and then water is to be added till the whole mixture becomes of the proper consistency for mortar or for moulding into form.

What I claim as my invention, and desire to secure by Letters Patent, is—

1. The composition formed of the material named, substantially as and for the purpose herein specified.

2. Iron ore, turnings, borings, or filings, in combination with hydraulic cement, for the formation of roofing, pavements, walls, docks, water bricks, pipes, and other structures, substantially as and for the purposes herein specified.

JOHN SEE.

Witnesses:
JOHN S. HOLLINGSHEAD,
JOHN C. HEISS.